UNITED STATES PATENT OFFICE.

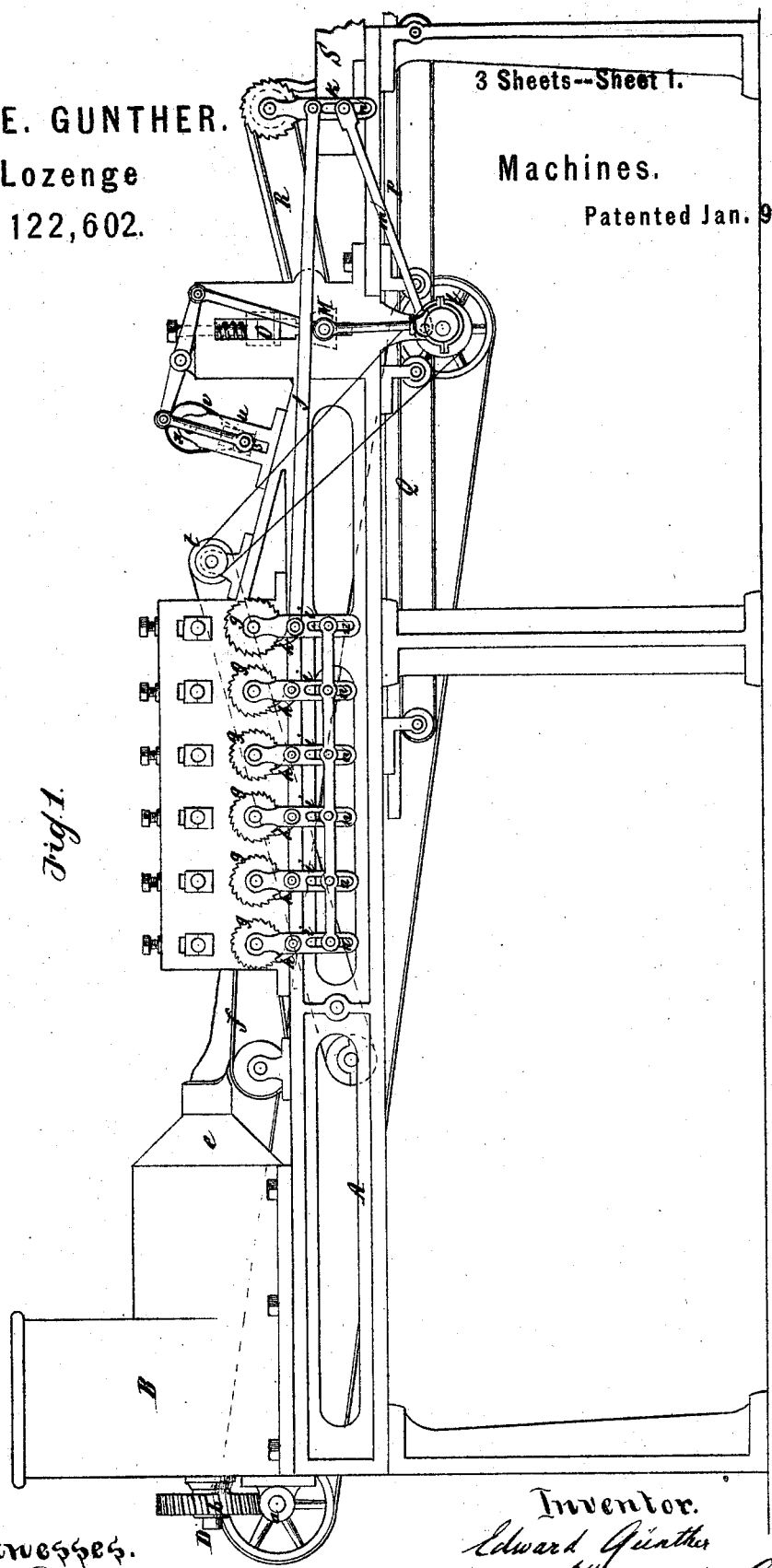

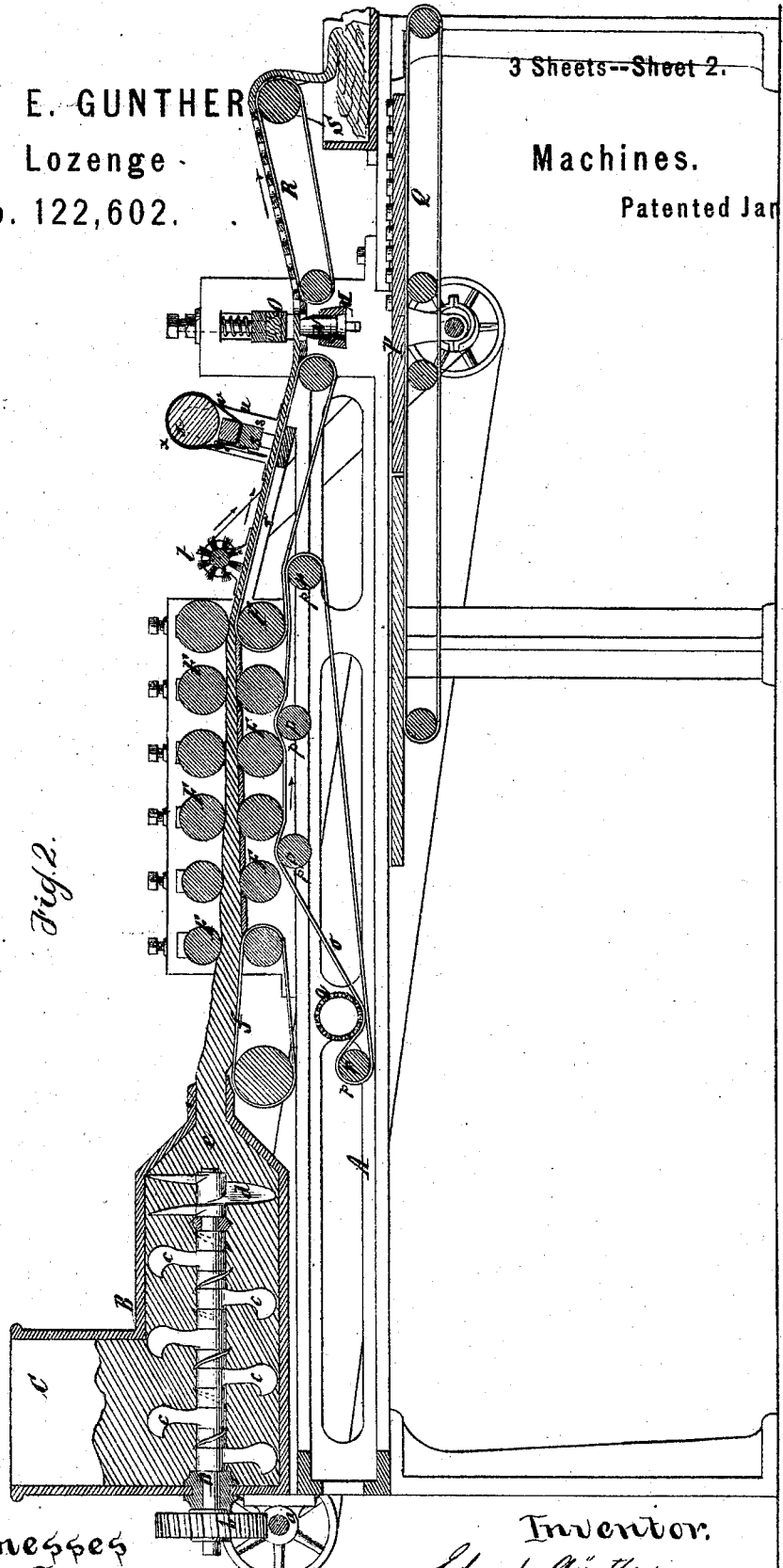

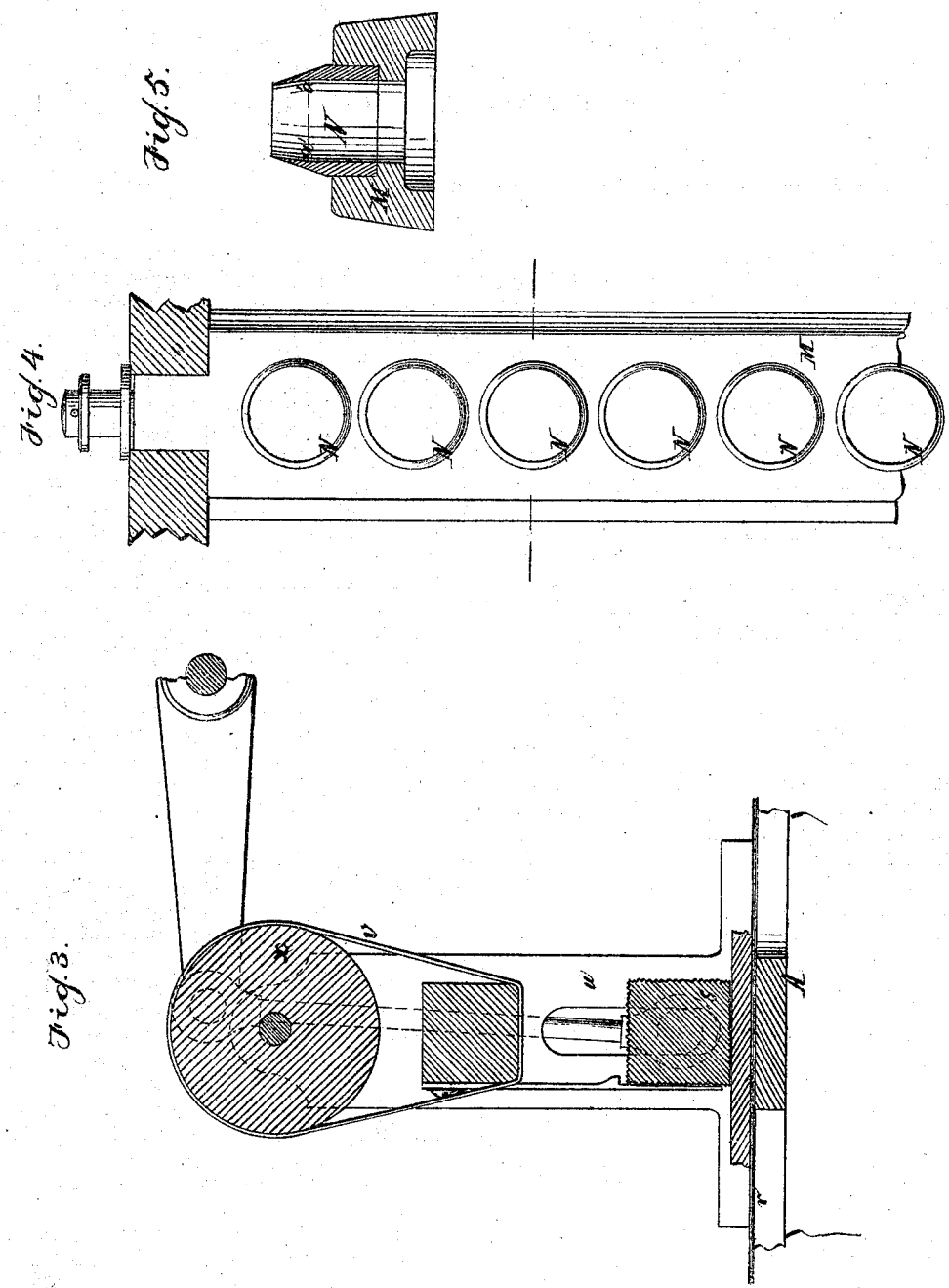

EDWARD GÜNTHER, OF NEW YORK, N. Y.

IMPROVEMENT IN LOZENGE-MACHINES.

Specification forming part of Letters Patent No. 122,602, dated January 9, 1872.

*To all whom it may concern:*

Be it known that I, EDWARD GÜNTHER, of the city, county, and State of New York, have invented a new and Improved Lozenge-Machine; and I do hereby declare the following to be a full, clear, and exact description thereof, which will enable those skilled in the art to make and use the same, reference being had to the accompanying drawing forming part of this specification, in which drawing—

Figure 1 represents a side view of this invention. Fig. 2 is a longitudinal vertical section of the same. Fig. 3 is a transverse section of the printing mechanism detached, in a larger scale than the previous figure. Fig. 4 is a plan or top view of the cutting mechanism detached. Fig. 5 is a transverse section of one of the cutters.

Similar letters indicate corresponding parts.

This invention relates to a lozenge-machine in which the dough is mixed in a suitable box by a series of hook-shaped knives set spirally on a shaft, to which a slow and powerful motion is imparted by a worm and worm-wheel. On this shaft is also mounted a feed-screw, which forces the mixed dough out through a spout and between a series of pressure-rollers, which gradually compress the same into a sheet of the required thickness, which is carried through between the cutters. The feed-motion of the pressure-rollers is adjustable, and the cutters are constructed in the shape of truncated cones, in such a form that the lozenges after having been cut drop readily through the same. With the pressure-rollers is combined a revolving sieve to spread flour over the surface of an apron which is carried past the pressing-rollers, so as to prevent the same from adhering to the dough.

In the drawing, the letter A designates a frame, on one end of which is secured a box, B, by preference made in the form of a cylinder, with a feed-opening, C. Through this box extends a shaft, D, which receives a slow and powerful motion by a worm, $a$, and worm-wheel $b$, and which carries a series of mixing-hooks, $c$, set spirally in the same, as shown. On said shaft is also secured a spiral feeder, $d$, which forces the mixed dough out through the conical spout $e$. On leaving this spout the dough is received on an endless apron, $f$, which conducts the same between a series of pressing-rollers, F, which are arranged in pairs, each succeeding pair being set somewhat closer than the preceding one, so that the dough is gradually compressed to a sheet of the requisite thickness. To prevent the dough from passing through the lower pressing-rollers the spaces between them are filled out, as shown in Fig. 2.

Each pair of pressing-rollers is geared together, and to the shaft of one roller in each pair is secured a ratchet-wheel, $g$, (see Fig. 1,) which is acted upon by a pawl, $h$, each pawl being secured to one of a series of levers, $i$, which are connected to each other, and one of which connects, by a rod, $j$, with a lever, $k$, to which an oscillating motion is imparted by an eccentric, $l$, and rod, $m$. The levers $k$ and $i$ are provided with oblong slots $n$, so that their connecting-rods can be adjusted toward and from their fulcrums, and thereby the motion of the several rollers can be gauged so as to draw out the dough to the required thickness, notwithstanding all the rollers derive their motion from one and the same eccentric; for it will be readily understood that by gradually increasing the motion of the succeeding pairs of pressing-rollers the dough is not only compressed but also drawn out. Beneath the lower series of pressing-rollers and in contact therewith runs an endless apron, $o$, which is stretched over rollers $p$, and which extends under a cylindrical sieve, $q$, containing flour of starch or other suitable material. The flour which is deposited from this sieve on the apron is brought in contact with the pressing-rollers, and thereby the dough is prevented from adhering to said rollers. As the dough leaves the last pair of pressing-rollers it passes upon an endless apron, $r$, by which it is carried through under the stamping-die $s$, and before being exposed to the action of this die the surface of the dough is cleaned by a revolving brush, $t$. The stamping-die $s$ moves up and down between slotted standards $u$, (see Fig. 1,) motion being imparted to it by an eccentric and working-beam, or by any other suitable means, and said die is made square or polygonal, and it receives a partial revolving motion on each stroke, so that on each downward motion a fresh surface thereof is brought in contact with the dough, while on each upward motion another of its surfaces is brought in contact with an endless ribbon, $v$, saturated with paint, ink, or other suitable coloring-matter, which may be supplied to it by suitable rollers, not shown in the drawing. This inking-ribbon extends over a drum, $x$, which has a slow revolving motion, so that the die each time on rising is brought in contact with a fresh portion of said ribbon, and by these means a uniform supply of ink or paint is transferred to the die. In Fig. 3 I have given a detached view of the stamping-die in a larger scale than the previous figure. After the dough has passed through under the stamping-die it is carried over the cutters N, which are set in a row across the machine, as shown in Fig. 4, and secured in a rail, M, to which a rising and falling motion is imparted by means of eccentrics mounted on the main shaft, or by any other suitable mechanism. As the cutter-bar rises the cutting-edges of the cutter are pressed against a traverse, O, which is made yielding by springs or otherwise, and each cutter cuts out a lozenge from the sheet of dough passing over the same.

The cutters themselves are made of peculiar form, as shown in Fig. 5, their bore being conical from the edge down to the point $a'$, so that their inner diameter increases. From the point $a'$ down the cutters are cylindrical. By this form of the cutters I effectually prevent the lozenges from sticking in the cutter, and each lozenge, after having been cut from the sheet of dough, readily passes down through the cutter and drops on a platform or board, P, carried by an endless apron, Q. (See Fig. 2.) The sheet of dough, after having been exposed to the action of the cutters, passes over an endless apron, R, and it collects in a receptacle, S, whence the same is carried back in the mixing-drum to be passed again through the machine.

By these means the operation of making lozenges is materially facilitated, and a very large quantity of lozenges can be produced in a short time and with very little hand-labor.

What I claim as new, and desire to secure by Letters Patent, is—

1. The mixing-hooks $c$ and spiral feeder $d$, in combination with the box B, conical spout $e$, and with a series of graduated pressing-rollers, F, which are geared together and receive a graduated feed-motion by lever-pawls $h$, substantially in the manner herein shown and described.

2. The flour-sieve $q$ and flour-distributing apron $o$, in combination with the graduated pressing-rollers F, constructed and operating substantially in the manner herein set forth.

3. The cleaning-brush $t$, in combination with the graduated pressing-rollers F, flour-distributing apron $o$, and stamping-die $s$, substantially as described.

4. The inking-ribbon $v$, in combination with the revolving-die $s$, and with the graduated dough-compressing rollers F, substantially as set forth.

5. The cutters N, having a conical bore increasing in diameter down to the point $a'$, substantially as shown and described.

This specification signed by me this 29th day of November, 1871.

E. GÜNTHER.

Witnesses:
W. HAUFF,
E. F. KASTENHUBER.